US008706791B2

(12) United States Patent
Jacob (Yaakov)

(10) Patent No.: US 8,706,791 B2
(45) Date of Patent: Apr. 22, 2014

(54) LOW POWER FIR FILTER IN MULTI-MAC ARCHITECTURE

(75) Inventor: Jeffrey Allan (Alon) Jacob (Yaakov), Raanana (IL)

(73) Assignee: Ceva D.S.P. Ltd., Herzlia Pituach (IL)

( * ) Notice: Subject to any disclaimer, the term of this patent is extended or adjusted under 35 U.S.C. 154(b) by 703 days.

(21) Appl. No.: 12/512,032

(22) Filed: Jul. 30, 2009

(65) Prior Publication Data

US 2011/0029589 A1    Feb. 3, 2011

(51) Int. Cl.
*G06F 7/38* (2006.01)
*G06F 17/10* (2006.01)

(52) U.S. Cl.
USPC .......................................... 708/523; 708/300

(58) Field of Classification Search
None
See application file for complete search history.

(56) References Cited

U.S. PATENT DOCUMENTS

| 5,862,063 | A | 1/1999 | Thome et al. | |
|---|---|---|---|---|
| 5,904,731 | A | 5/1999 | Matsui | |
| 5,931,892 | A * | 8/1999 | Thome et al. | 708/322 |
| 6,978,287 | B1 * | 12/2005 | Langhammer | 708/230 |
| 2007/0121716 | A1 | 5/2007 | Nagarajan et al. | |

FOREIGN PATENT DOCUMENTS

| JP | 11-96136 | 4/1999 |
|---|---|---|
| JP | 2002-73586 | 3/2002 |

OTHER PUBLICATIONS

A.T. Erdogan et al.—University of Edinburgh, Edinburgh, EH9 3JL, UK . The Institute for System Level Integration, Alba Campus, Livingston, EH54 7EG, UK. Low Power FIR Filter Implementations Based on Coefficient Ordering Algorithm Proceedings for the IEEE Computer Society Annual Symposium on VLSI Emerging Trends in VLSI Systems Design (ISVLSI'04) 2004.

Extended European Search Report for EP Application No. 10170647.1 Dated Dec. 14, 2010.

* cited by examiner

*Primary Examiner* — Idriss N Alrobaye
*Assistant Examiner* — Dayton Lewis-Taylor
(74) *Attorney, Agent, or Firm* — Pearl Cohen Zedek Latzer Baratz LLP (57) ABSTRACT

Embodiments of the invention are directed to system and method that enable relatively low power dissipation by scheduling operations of multiply accumulators chain of two or more multiply accumulators units by delivering an output result of a first multiply accumulator of the chain as an input to a second subsequent multiply accumulator of the chain.

15 Claims, 5 Drawing Sheets

FIG. 5

LOW POWER FIR FILTER IN MULTI-MAC ARCHITECTURE

BACKGROUND

Many digital signal processors (DSP) architectures and other hardware accelerators applications may involve a series of multiplications and/or accumulations. Accordingly, a plurality of high-throughput multiply-accumulate (MAC) units may be used in order to achieve high performance.

Maximizing performance by using a plurality of MAC units simultaneously may result in high power dissipation. However, many applications today, for example, in the portable electronics market, require low power consumption. Thus, there is a need for multi-MAC architecture to achieve low power without sacrificing performance.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF DEMONSTRATIVE EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Embodiments of the invention may be used in signal processing in a variety of fields such as audio and speech signal processing, sonar and radar signal processing, sensor array processing, spectral estimation, statistical signal processing, digital image processing, signal processing for communications, biomedical signal processing, seismic data processing and the like. Embodiments of the invention may be implemented in digital signal processors (DSP's), for example in finite impulse response (FIR) filtering and in hardware accelerators. For ease of explanation, some embodiments of the invention are described with respect to FIR filters, however, the invention is not limited to FIR filters and is applicable to any multi-multiply and accumulate (multi-MAC) architectures.

Embodiments of the invention may include a chain of two or more multiply accumulators, each comprises a multiplier and an adder. The multiply accumulators may be arranged such that an output result of a first multiply accumulator of the chain may be delivered as an input to an adder of a second subsequent multiply accumulator of the chain and an output result of a last multiply accumulator of the chain may be delivered as an input to an adder of the first multiply accumulator of the chain.

Figure 1:
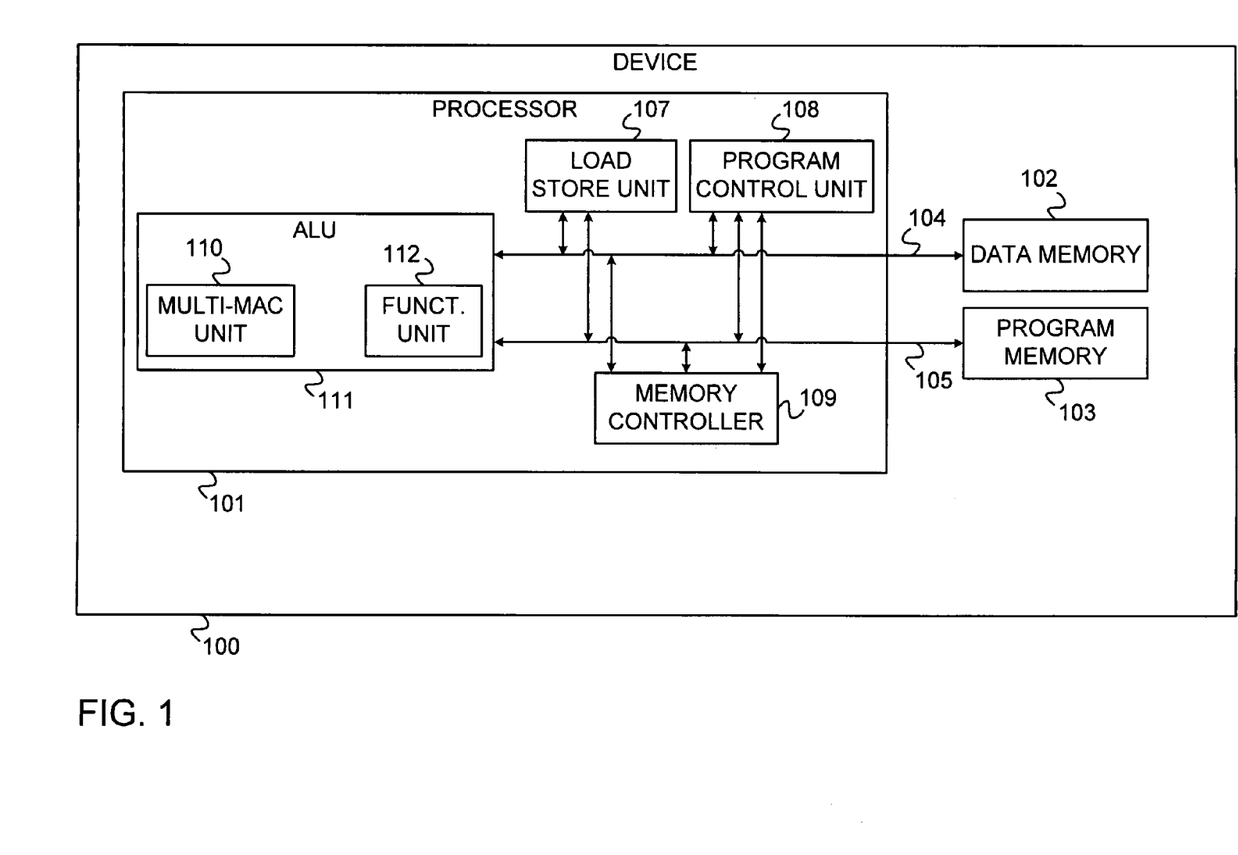
FIG. 1 is a high level block diagram of an exemplary device according to embodiments of the present invention.

Reference is now made to FIG. 1, which is a block diagram of an exemplary device including a processor according to embodiments of the present invention. An exemplary device 100 may comprise a processor 101, a data memory unit 102 and a program memory unit 103. Device 100 may be a computer device, cellular device, a consumer electronics device or any other digital device. Processor 101 may be a digital signal processor (DSP), an application-specific integrated circuit (ASIC), a field-programmable gate array (FPGA) or may be implemented in any other hardware, software or a combination of hardware and software. Processor 101 may be coupled to data memory unit 102 via a data memory bus 104 and to program memory unit 103 via a program memory bus 105. Data memory 102 and program memory 103 may be implemented as two separate memories or integrated within a single memory unit.

With respect to FIG. 1, an exemplary architecture for processor 101 is described, although it should be understood to those skilled in the art that other architectures are also possible. Processor 101 may include a program control unit 108, a load/store unit 107, an arithmetic logic unit (ALU) 111 and a memory controller 109. Memory controller 109 may include a data memory controller (not shown) coupled to a data memory bus 104, and a program memory controller (not shown) coupled to a program memory bus 105. Load/store unit 107 may perform load and store operations from/to data memory unit 102. Program control unit 108 may retrieve, decode and dispatch machine language instructions from program memory unit 103 and may be responsible, in general, to the program flow.

ALU 111 may include a multi multiply-accumulate (MAC) unit or multi multiply-accumulator 110 comprising two or more multiply-accumulate (MAC) units or structures and an arithmetic logic or functional unit 112. Functional unit 112 may perform one or more functionalities including add functions, subtract functions, bit manipulation, arithmetic logic and/or other general operations and any combination thereof. Although in the exemplary illustration of FIG. 1, a single multi-MAC unit and a single functional unit are shown, it should be understood to a person skilled in art that the invention is not limited in this respect and according to embodiments of invention any other number of multi-MAC units and functional units may be used.

Multi MAC unit 110 may maximize the performance of the processor by using a plurality of MAC units simultaneously. Multi MAC unit 110 may be configured to enable scheduling MAC operations on multiple MAC units with low power dissipation.

It should be noted that device 100 may further include other blocks, modules, operations and units which may perform or may take part in performing processing functions or operations. In the exemplary illustration of FIG. 1, processor 101 includes program control unit 108, load/store unit 107, ALU 111, and memory controller 109, however, it should be understood to a person skilled in art that the invention is not limited in this respect and according to embodiments of the present invention any number and any kind of blocks, units and/or modules may be included in processor 101 and in device 100.

Figure 2:
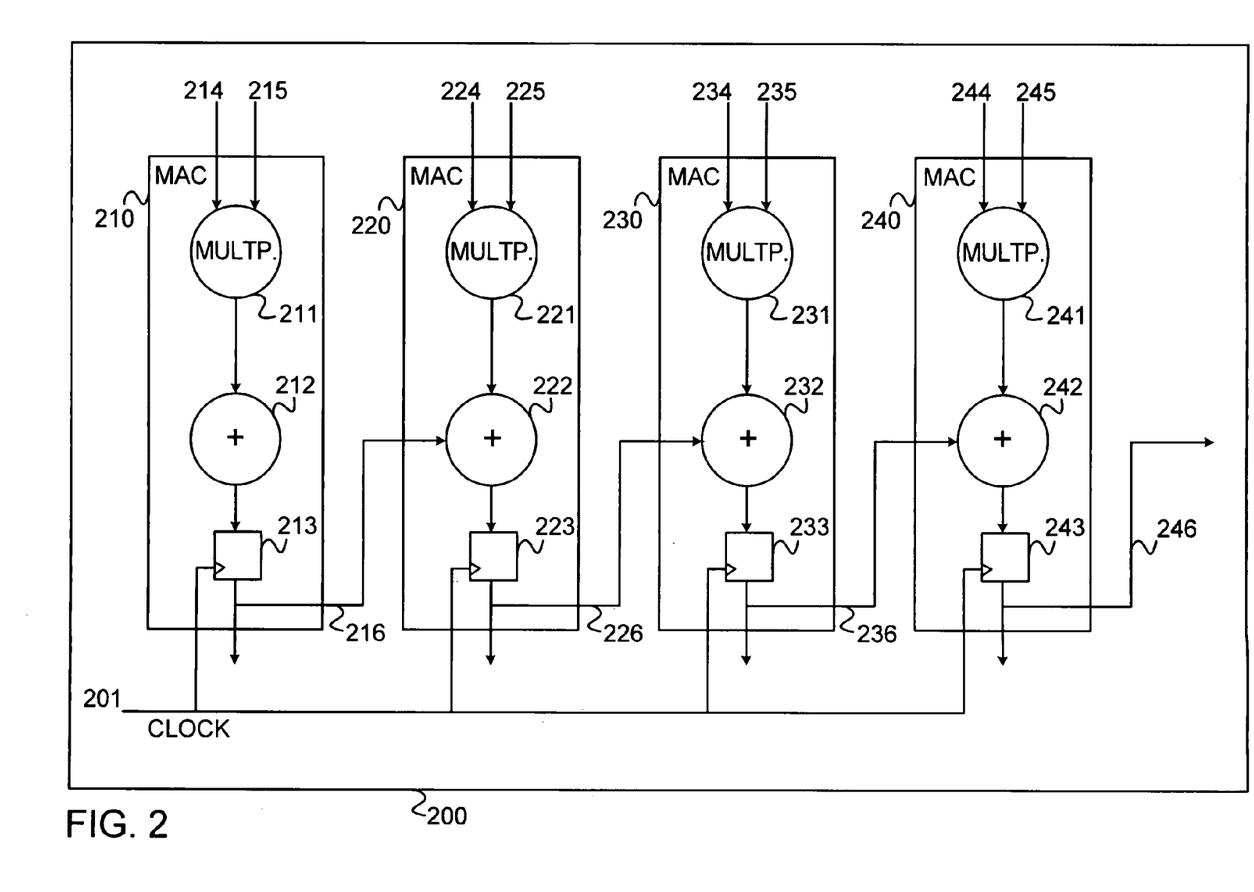
FIG. 2 is a block diagram of an exemplary multi-MAC configuration according to embodiments of the present invention.

Reference is now made to FIG. 2, which is a block diagram of an exemplary multi-MAC unit according to demonstrative embodiments of the invention. A multi-MAC unit, such as multi MAC unit 200 may be part of a processor, such as processor 101 of FIG. 1. Multi-MAC unit 200 may include a plurality of MAC units or structures, for example, MAC unit 210, MAC unit 220, MAC unit 230 and MAC unit 240. Although in the exemplary illustration of FIG. 2, four MAC units are shown, it should be understood to a person skilled in art that the invention is not limited in this respect and according to embodiments of the present invention two or more MAC units may be used.

Each of the MAC units may include a multiplier, an adder and a memory element or unit. For example, MAC unit 210 may include a multiplier 211, an adder 212 and a memory unit or element 213; MAC unit 220 may include a multiplier 221, an adder 222 and a memory element 223; MAC unit 230 may include a multiplier 231, an adder 232 and a memory element 233; and MAC unit 240 may include a multiplier 241, an adder 242 and a memory element 243. Memory elements 213, 223, 233 and 243 may be clocked memory elements operated by a clock signal 201 and each memory element may store values, received from its respective adder, for a predetermined period determined by the clock signal.

Each of the MAC units 210, 220, 230 and 240 may include two input signals to receive input operands. The input operands may be received, for example, from data memory 102 via load/store unit 107 of FIG. 1. For example, multiplier 211 of MAC unit 210 may receive a coefficient value via an input signal 214 and a data value via an input signal 215; multiplier 221 of MAC unit 220 may receive a coefficient value via an input signal 224 and a data value via an input signal 225; multiplier 231 of MAC unit 230 may receive a coefficient value via an input signal 234 and a data value via an input signal 235; and multiplier 241 of MAC unit 240 may receive a coefficient value via an input signal 244 and a data value via an input signal 245.

According to exemplary embodiments of the invention, multi-MAC unit 200 may be used for FIR filtering. A finite impulse response (FIR) filter is governed by the following equation relating an input signal to an output signal:

$$y[n]=\Sigma c[i]\cdot x[n-i]$$

where x[n] represents a data value of the input signal, c[i] represents the coefficient value, y[n] represents the output signal and the summation is taken over all the i coefficients from i equals from zero to i equals to N according to the filter order N, where an Nth order filter has (n+1) terms on the right side of the equation.

In a single MAC configuration, the MAC unit may receive a coefficient value and a data value of the input signal as the input operands and may perform a single MAC operation on every clock cycle. The coefficient value c[i] is multiplied by the data value x[n−i] and the result is accumulated on a single accumulator as y[n] output signal. On the next cycle, the coefficient c[i+1] is multiplied by the data value x[n−i−1] and the result is accumulated to the same y[n] output.

In multi MAC architecture, the operations may be parallelized. For example, for a four-MAC architecture, on every cycle four MAC operations may occur, each corresponding to a different output signal y[n] through y[n+3] according to the following equations:

$$y[n]=\Sigma c[i]\cdot x[n-i]$$

$$y[n+1]=\Sigma c[i]\cdot x[n+1-i]$$

$$y[n+2]=\Sigma c[i]\cdot x[n+2-i]$$

$$y[n+3]=\Sigma c[i]\cdot x[n+3-i]$$

According to embodiments of the invention, the four parallel operations may be scheduled on four available MAC units, such as units 210-240, in an efficient manner that may reduce power dissipation. Relatively low power dissipation may be achieved by using for each MAC unit, a single coefficient value as an input operand to the multiplier for all the cycles required to calculate the output.

Tables 1 and 2 show a schedule for four parallel MAC units that use the same coefficient input for eight cycles while the data multiplicand input is replaced in every cycle by the next data index. During these eight cycles, eleven different output signals are being handled by the four MAC units (from y[n+k−7] to y[n+k+3]).

TABLE 1

| | MAC 210 | | | MAC 220 | | |
|---|---|---|---|---|---|---|
| Cycle | Coefficient | Data | Accumulator | Coefficient | Data | Accumulator |
| k | c[k] | x[n] | y[n + k] | c[k + 1] | x[n] | y[n + k + 1] |
| k + 1 | c[k] | x[n − 1] | y[n + k − 1] | c[k + 1] | x[n − 1] | y[n + k] |
| k + 2 | c[k] | x[n − 2] | y[n + k − 2] | c[k + 1] | x[n − 2] | y[n + k − 1] |
| k + 3 | c[k] | x[n − 3] | y[n + k − 3] | c[k + 1] | x[n − 3] | y[n + k − 2] |
| k + 4 | c[k] | x[n − 4] | y[n + k − 4] | c[k + 1] | x[n − 4] | y[n + k − 3] |
| k + 5 | c[k] | x[n − 5] | y[n + k − 5] | c[k + 1] | x[n − 5] | y[n + k − 4] |
| k + 6 | c[k] | x[n − 6] | y[n + k − 6] | c[k + 1] | x[n − 6] | y[n + k − 5] |
| k + 7 | c[k] | x[n − 7] | y[n + k − 7] | c[k + 1] | x[n − 7] | y[n + k − 6] |

TABLE 2

| | MAC 230 | | | MAC 240 | | |
|---|---|---|---|---|---|---|
| Cycle | Coefficient | Data | Accumulator | Coefficient | Data | Accumulator |
| k | c[k + 2] | x[n] | y[n + k + 2] | c[k + 3] | x[n] | y[n + k + 3] |
| k + 1 | c[k + 2] | x[n − 1] | y[n + k + 1] | c[k + 3] | x[n − 1] | y[n + k + 2] |
| k + 2 | c[k + 2] | x[n − 2] | y[n + k] | c[k + 3] | x[n − 2] | y[n + k + 1] |
| k + 3 | c[k + 2] | x[n − 3] | y[n + k − 1] | c[k + 3] | x[n − 3] | y[n + k] |
| k + 4 | c[k + 2] | x[n − 4] | y[n + k − 2] | c[k + 3] | x[n − 4] | y[n + k − 1] |
| k + 5 | c[k + 2] | x[n − 5] | y[n + k − 3] | c[k + 3] | x[n − 5] | y[n + k − 2] |

TABLE 2-continued

| | MAC 230 | | | MAC 240 | | |
|---|---|---|---|---|---|---|
| Cycle | Coefficient | Data | Accumulator | Coefficient | Data | Accumulator |
| k + 6 | c[k + 2] | x[n − 6] | y[n + k − 4] | c[k + 3] | x[n − 6] | y[n + k − 3] |
| k + 7 | c[k + 2] | x[n − 7] | y[n + k − 5] | c[k + 3] | x[n − 7] | y[n + k − 4] |

As shown in Tables 1 and 2, according to exemplary embodiments of the invention, in every cycle, four MAC operations may occur. For example, cycle 1 may include the following operations: (1) the coefficient c[1] received on input node 214 of multiplier 211 of MAC unit 210 is multiplied by the multiplicand x[n] and accumulated to the output signal y[n+1] on adder or accumulator 212 of MAC unit 210; (2) the coefficient c[2] received on input node 224 of multiplier 221 of MAC unit 220 is multiplied by the multiplicand x[n] and accumulated to the output signal y[n+2] on adder or accumulator 222 of MAC unit 220; (3) the coefficient c[3] received on input node 234 of multiplier 231 of MAC unit 230 is multiplied by the multiplicand x[n] and accumulated to the output signal y[n+3] on adder or accumulator 232 of MAC unit 230; and (4) the coefficient c[4] received on input node 244 of multiplier 241 of MAC unit 240 is multiplied by the multiplicand x[n] and accumulated to the output signal y[n+4] on adder or accumulator 242 of MAC unit 240. The result may be shifted out of memory element 243 via signal line 246 and if needed may be stored in a buffer (not shown) to be later returned in a later cycle, for example, to MAC unit 210 to accumulate the result of the coefficient c[1].

According to exemplary embodiments of the invention, each of MAC units 210, 220, 230 and 240 may receive the same coefficient input in all the cycles, namely, the multipliers of MAC units 210, 220, 230 and 240 may receive coefficient, e.g., of a finite impulse response filter, that may be constant or unchanged for a predetermined time duration. For example, the same coefficient value, c[k] may be received on input signal 214 of multiplier 211 of MAC unit 210 for all the cycles, designate k to k+7, as shown in column 2 of Table 1. Likewise, the coefficient c[k+1] may be received on input node 224 of multiplier 221 of MAC unit 220 for the eight cycles, as shown in column 5 of Table 1; the coefficient c[k+2] may be received on input 234 of multiplier 231 of MAC unit 230 for all the cycles, as shown in column 2 of Table 2 and the coefficient c[k+3] may be received on input 244 of multiplier 241 of MAC unit 240 for the eight cycles, as shown in column 5 of Table 2.

In some cases the number of MAC units may be smaller than the number of coefficients used to calculate each output signal y[n]. For example, each output signal y[n] may use eight c[i] coefficients. Accordingly, after completing the accumulation based on the first four coefficients for each output signal, the accumulation may continue for each eleven output signals for the next set of coefficients c[5] to c[8]. For example, MAC unit 210 may receive the coefficient c[5] for the next cycles, MAC unit 220 may receive the coefficient c[6] for the next cycles, MAC unit 230 may receive the coefficient c[7] for the next cycles and MAC unit 240 may receive the coefficient c[8] for the next cycles.

The data multiplicand input in every cycle may be replaced by the next data index. For example, in MAC unit 210 after cycle k, data x[n] is replaced by data x[n−1], and after cycle k+m, data x[n−m] is replaced by data x[n−m−1]. Accordingly, cycle 2 may include the following operations: (1) the coefficient c[1] received on input signal 214 of multiplier 211 of MAC unit 210 is multiplied by the multiplicand x[n−1] and accumulated to the output signal y[n] on adder or accumulator 212 of MAC unit 210; (2) the coefficient c[2] received on input signal 224 of multiplier 221 of MAC unit 220 is multiplied by the multiplicand x[n−1] and accumulated to the output signal y[n+1] on adder 222 of MAC unit 220; (3) the coefficient c[3] received on input signal 234 of multiplier 231 of MAC unit 230 is multiplied by the multiplicand x[n−1] and accumulated to the output signal y[n+2] on adder 232 of MAC unit 230; and (4) the coefficient c[4] received on input signal 244 of multiplier 241 of MAC unit 240 is multiplied by the multiplicand x[n−1] and accumulated to the output signal y[n+3] on adder 242 of MAC unit 240. The result may be shifted out of memory element 243 via signal line 246 and if needed may be stored in a buffer (not shown) to be later returned in a later cycle, for example, to MAC unit 210 to accumulate the result of the coefficient c[1].

According to embodiments of the invention, as shown in Tables 1 and 2, for a given output signal having, for example, 8 multiplication terms, the output result of each multiplication may be accumulated into a different accumulator or adder 212, 222, 232 or 242, where for each cycle another MAC unit may be used. From the last MAC unit, the result may be shifted out of multi-MAC unit 200 to be revisited for the accumulation of additional coefficients at a later stage of the schedule.

This may be implemented by shifting the output result of an accumulator to an adjacent MAC unit for the following cycle. For example, an output result in cycle k of adder 212 of MAC unit 210 may be transferred, shifted or mapped to adder 222 of MAC unit 220 via memory element 213 and output line 216 for the next cycle. As shown by Table 1, accumulator 212 of MAC unit 210 may hold output signal y[n+k] at cycle k while accumulator 222 of MAC unit 220 may hold output signal y[n+k] at the next cycle k+1. Further, the output result in cycle k+1 of accumulator 222 of MAC unit 220 may be transferred, shifted or mapped via memory element 223 and output line 226 to adder or accumulator 232 of MAC unit 230 for the next cycle. As shown by Table 2, accumulator or adder 232 of MAC unit 230 may hold output signal y[n+k] at cycle k+2. Further, the output result in cycle k+2 of accumulator 232 of MAC unit 230 may be transferred, shifted or mapped via memory element 233 and signal line 236 to adder 242 of MAC unit 240 for the next cycle. As shown by Table 2, accumulator or adder 242 of MAC unit 240 may hold output signal y[n+k] at cycle k+3. The output result of accumulator 242 of MAC unit 240 for output signal y[n+k] may be shifted out via memory element 243 and signal line 246 as the final result of multi-MAC unit 200.

The schedule implemented by FIG. 2 as described by Tables 1 and 2 may reduce power dissipation relative to using four "stand alone" MAC units, where each MAC unit accumulates a different output signal y[n] using the same coefficient c[i] as input to all four multipliers and a different data multiplicand x[n−i] through x[n+3−i]. On the next cycle of the "stand alone" configuration, the coefficient c[i+1] may be used as an input to all four multipliers, while each multiplier may use the next data multiplicand x[n−i−1] through x[n+3−i−1]. The schedule presented by Tables 1 and 2 may be most suitable when the number of available MAC units in the multi-MAC architecture does not exceed the number of coefficients in an output signal, but may be costly in terms of storing and re-loading each of the outputs if the number of coefficients is larger than the number of MAC units capable or processing simultaneously.

It should be understood to a person skilled in the art that although the FIG. 2 depicts four MAC units, the multi-MAC architecture may be generalized to any number of MAC units.

If the number of MAC units is P, the output signal y[n] is operated P times before being shifted out. When the number of MAC units is greater than or equals the number of i coefficients, the schedule presented by Tables 1-2 may be an efficient optimal schedule in terms of both power dissipation and bandwidth. However, if the number of coefficients used to calculate an output signal i is larger than the number of MAC units P, then the partial output result of each output signal y[n] would need to be re-loaded back into the multi-MAC unit. The storing and re-loading operation of the partial output signal results may reduce, in certain conditions, the efficiency in terms of storage, bandwidth and power dissipation.

Figure 3:
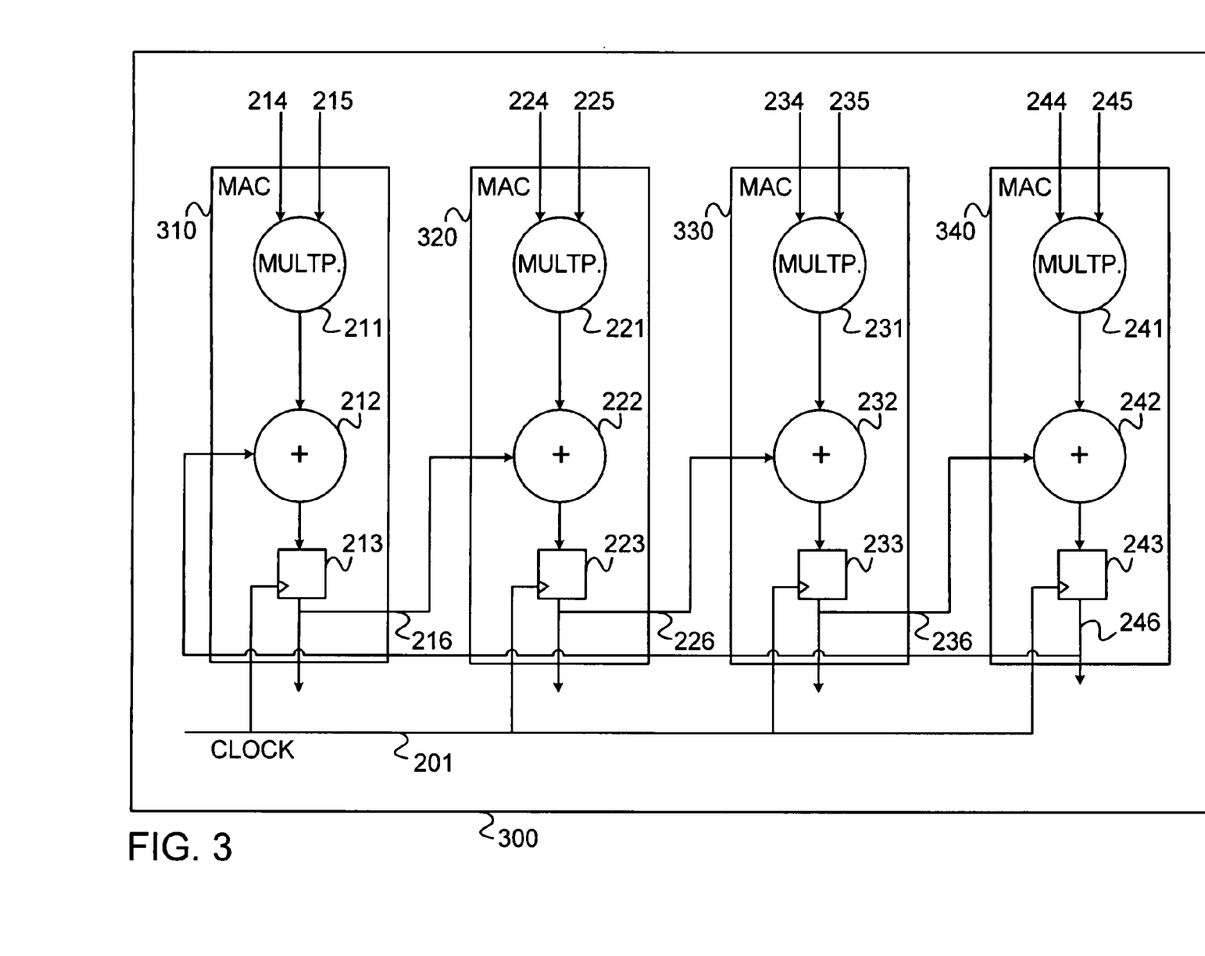
FIG. 3 is a block diagram of an exemplary multi-MAC configuration according to embodiments of the present invention.

Reference is now made to FIG. 3, which is block diagram of an exemplary multi-MAC unit according to some embodiments of the present invention. A multi-MAC unit, such as multi-MAC unit may be part of a processor, such as processor 101 of FIG. 1. Multi-MAC unit 300 may include a plurality of MAC units or structures, for example, MAC unit 310, MAC unit 320, MAC unit 330 and MAC unit 340. Each multi-MAC unit 310-340 may include a respective multiplier, adder and accumulator. Multi-MAC unit 300 is similar to multi-MAC unit 200 of FIG. 2 and similar elements are referenced with similar numerals. Although in the exemplary illustration of FIG. 3, four MAC units are shown, it should be understood to a person skilled in art that the invention is not limited in this respect and according to embodiments of the present invention two or more MAC units may be used.

According to embodiments of the invention, memory element 243 of multi-MAC unit 340 may be coupled to adder 212 of multi-MAC unit 310 via a signal line 246. The architecture of multi-MAC unit 300 may enable the use of the schedule presented by Tables 3 and 4. Such a schedule may be suitable when the number of coefficients used to calculate the output signal is greater than the number of MAC structures in the multi-MAC unit.

According to embodiments of the invention, the schedule that may be implemented by multi-MAC unit 300 having four MAC units. Each MAC unit may receive as input the same coefficient operand for four cycles. Then, the coefficient indexed may be incremented by four. In general, an architecture with P MAC units may maintain the coefficient index k of the coefficient inputs to every multiplier for P cycles before replacing the coefficient index with a new index k+P. Such a schedule may optimize the multiplier power dissipation while operating on the output y[n] for all i coefficients before storing the result.

Tables 3 and 4 show a schedule four parallel MAC units that use the same coefficient input for four cycles and then incrementing the coefficient index by four and using the new coefficient input for another four cycles. In this schedule the data multiplicand input is replaced in every cycle by the next data index. During these eight cycles, four output signals are being handled by the four MAC units (from y[n+k−3] to y[n+k]).

TABLE 3

| | MAC 310 | | | MAC 320 | | |
|---|---|---|---|---|---|---|
| Cycle | Coefficient | Data | Accumulator | Coefficient | Data | Accumulator |
| k | c[k] | x[n] | y[n + k] | c[k − 3] | x[n] | y[n + k − 3] |
| k + 1 | c[k] | x[n − 1] | y[n + k − 1] | c[k + 1] | x[n − 1] | y[n + k] |
| k + 2 | c[k] | x[n − 2] | y[n + k − 2] | c[k + 1] | x[n − 2] | y[n + k − 1] |
| k + 3 | c[k] | x[n − 3] | y[n + k − 3] | c[k + 1] | x[n − 3] | y[n + k − 2] |
| k + 4 | c[k + 4] | x[n − 4] | y[n + k] | c[k + 1] | x[n − 4] | y[n + k − 3] |
| k + 5 | c[k + 4] | x[n − 5] | y[n + k − 1] | c[k + 5] | x[n − 5] | y[n + k] |
| k + 6 | c[k + 4] | x[n − 6] | y[n + k − 2] | c[k + 5] | x[n − 6] | y[n + k − 1] |
| k + 7 | c[k + 4] | x[n − 7] | y[n + k − 3] | c[k + 5] | x[n − 7] | y[n + k − 2] |

TABLE 4

| | MAC 330 | | | MAC 340 | | |
|---|---|---|---|---|---|---|
| Cycle | Coefficient | Data | Accumulator | Coefficient | Data | Accumulator |
| k | c[k − 2] | x[n] | y[n + k − 2] | c[k − 1] | x[n] | y[n + k − 1] |
| k + 1 | c[k − 2] | x[n − 1] | y[n + k − 3] | c[k − 1] | x[n − 1] | y[n + k − 2] |
| k + 2 | c[k + 2] | x[n − 2] | y[n + k] | c[k − 1] | x[n − 2] | y[n + k − 3] |
| k + 3 | c[k + 2] | x[n − 3] | y[n + k − 1] | c[k + 3] | x[n − 3] | y[n + k] |
| k + 4 | c[k + 2] | x[n − 4] | y[n + k − 2] | c[k + 3] | x[n − 4] | y[n + k − 1] |
| k + 5 | c[k + 2] | x[n − 5] | y[n + k − 3] | c[k + 3] | x[n − 5] | y[n + k − 2] |
| k + 6 | c[k + 6] | x[n − 6] | y[n + k] | c[k + 3] | x[n − 6] | y[n + k − 3] |
| k + 7 | c[k + 6] | x[n − 7] | y[n + k − 1] | c[k + 7] | x[n − 7] | y[n + k] |

As shown by Tables 3 and 4, the coefficient c[k] may be received on input 214 of multiplier 211 of MAC unit 310 for four cycles (from cycle k to cycle k+3) and after four cycles the coefficient c[k+4] may be received on the same input for another four cycles (from cycle k+4 to cycle k+7). As further shown Tables 3 and 4, the data multiplicand input may be replaced, in every cycle, by the next data index. For example, in MAC unit 310 after cycle k, data x[n] is replaced by data x[n−1], and after cycle k+m, data x[n−m] is replaced by data x[n−m−1].

This may be implemented by shifting the output result of an accumulator to an adjacent MAC unit for the following cycle. The output of each multiplication may be accumulated into a different accumulator on each cycle. For a given output signal having, for example, 8 multiplication terms, the output result of each multiplication may be accumulated into a different accumulator 212, 222, 232 or 242, where for each cycle another MAC unit may be used. After four cycles, the result may be transferred from the last MAC unit in the chain 240 to the first MAC unit of the chain 210.

This may be implemented by shifting each of the accumulator outputs to the adjacent MAC unit for the following cycle. The output of the last MAC unit may be shifted back to the adder of the first MAC unit.

For example, Output 216 of adder 212 of MAC unit 310 may be transferred to adder 222 of MAC unit 320, output 226 from adder 222 of MAC unit 320 may be transferred to adder 232 of MAC unit 330, output 236 from adder 232 of MAC unit 330 may be transferred to adder 242 of MAC unit 340 and output 246 may be shifted back as an input to adder 212 of MAC unit 310.

For example, an output result in cycle k of accumulator 212 of MAC unit 310 may be transferred, shifted or mapped via signal line 216 to adder 222 of MAC unit 320 for the next cycle. As shown by Table 3, accumulator 212 of MAC unit 310 may hold output signal y[n+k] at cycle k while accumulator 222 of MAC unit 320 may hold output signal y[n+k] at the next cycle k+1. Further, the output result in cycle k+1 of accumulator 222 of MAC unit 320 may be transferred, shifted or mapped via signal line 226 to adder 232 of MAC unit 330 for the next cycle. As shown by Table 4, accumulator 232 of MAC unit 330 may hold output signal y[n+k] at cycle k+2. Further, the output result in cycle k+2 of accumulator 232 of MAC unit 330 may be transferred, shifted or mapped via signal line 236 to adder 242 of MAC unit 340 for the next cycle. As shown by Table 4, accumulator 242 of MAC unit 340 may hold output signal y[n+k] at cycle k+3. The output result in cycle k+3 of accumulator 242 of MAC unit 340 for output signal y[n+k] may be shifted back to accumulator or adder 212 of MAC unit 310 via signal line 246.

The schedule continues for another four cycles and the final output result of multi-MAC unit for the output signal y[n+k] includes all the multiplications for all 8 coefficients.

In the multi-MAC architecture presented in FIG. 3 with four MAC units each output y[n] of an adder is operated on four times, accumulating the results of four multiplications of the four multipliers, before being shifted back to the first adder 212. It should be understood to a person skilled in the art that this architecture may be generalized to architecture with P MAC units, where each output may be operated on P times before being shifted back.

Actual lab results of the system and method described by FIG. 3 demonstrated that such an architecture may achieve a power savings of around 23% relative to a system having a plurality of MAC units, each works as a "stand alone" MAC. The 23% power saving was measured while using random coefficient inputs and random data inputs. Using random coefficient inputs and slowly varying data inputs, as common in many applications, resulted in power saving of around 50% relative to a system having a plurality of MAC units, each operating as a "stand alone" MAC.

Figure 4:
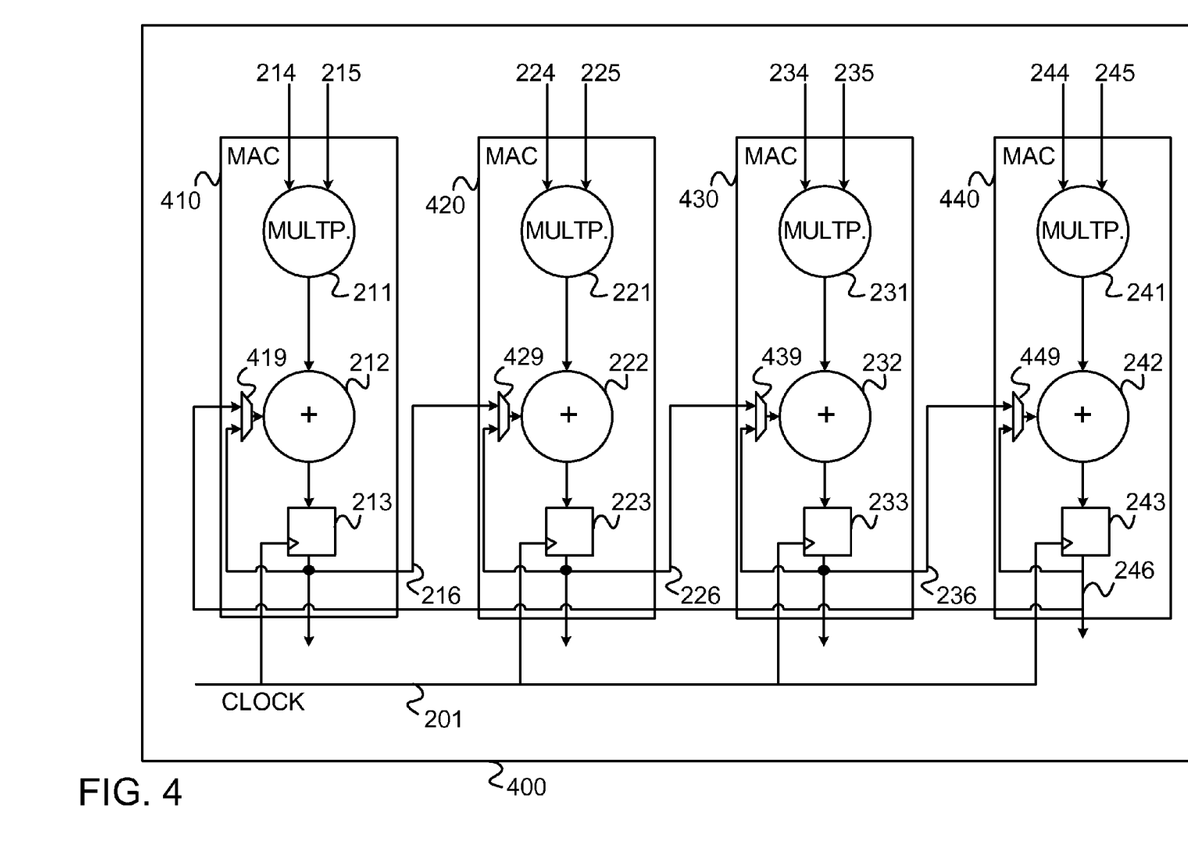
FIG. 4 is a block diagram of an exemplary multi-MAC configuration according to embodiments of the present invention.

Reference is now made to FIG. 4, which is a block diagram of an exemplary multi-MAC unit according to embodiments of the present invention. A multi-MAC unit, for example 400 may be implemented, for example as multi-MAC unit 110 of FIG. 1. According to embodiments of the invention, the architecture of multi-MAC unit 400 may enable the implementation of two or more schedules. Multi-MAC unit 400 may include a plurality of MAC units or MAC structures, for example, MAC unit 410, MAC unit 420, MAC unit 430 and MAC unit 440. Although in the exemplary illustration of FIG. 4, four MAC units are shown, it should be understood to a person skilled in art that the invention is not limited in this respect and according to embodiments of the present invention two or more MAC units may be used.

Each of MAC units 410-440 may include a multiplier, an adder and a memory element, similarly to MAC units 200 and 300, and further a multiplexer. For example, MAC unit 410 may include multiplexer 419; MAC unit 420 may include multiplexer 429; MAC unit 430 may include multiplexer 439; and MAC unit 440 may include multiplexer 449.

The output of an accumulator may be shifted to another MAC unit to be accumulated into a different accumulator on each cycle or may be accumulated into the same adder. In each of the MAC units 410, 420, 430 and 440 a selection may be made regarding whether to use the output of the adder as an input to the same adder or to shift the output of the adder as an input to the adder of the adjacent MAC unit. Such logic may be implemented by multiplexers 419, 429, 439 and 449 shown by FIG. 4. Multiplexer 429 may select between the output of adder 212 and the output of adder 222 and may transfer one of the outputs to the input of adder 222. Multiplexer 439 may select between the output of adder 222 and the output of adder 232 and may transfer one of the outputs to the input of adder 232. Multiplexer 449 may select between the output of adder 232 and the output of adder 242 and may transfer one of the outputs to the input of adder 242. Multiplexer 419 may select between the output of adder 212 and the output of adder 242 and may transfer one of the outputs to the input of adder 212.

It should be understood to a person skilled in the art that the architecture presented in FIG. 4 may be generalized to an architecture with any number MAC units. An embodiment of the invention having an architecture with two MAC units, namely a first and a second MAC units may include a first multiplexer to select either the output of the first adder or the output of the second adder as an input to the first adder and a second multiplexer to select either the output of the second adder or the output of the first adder as an input to the second adder.

Figure 5:
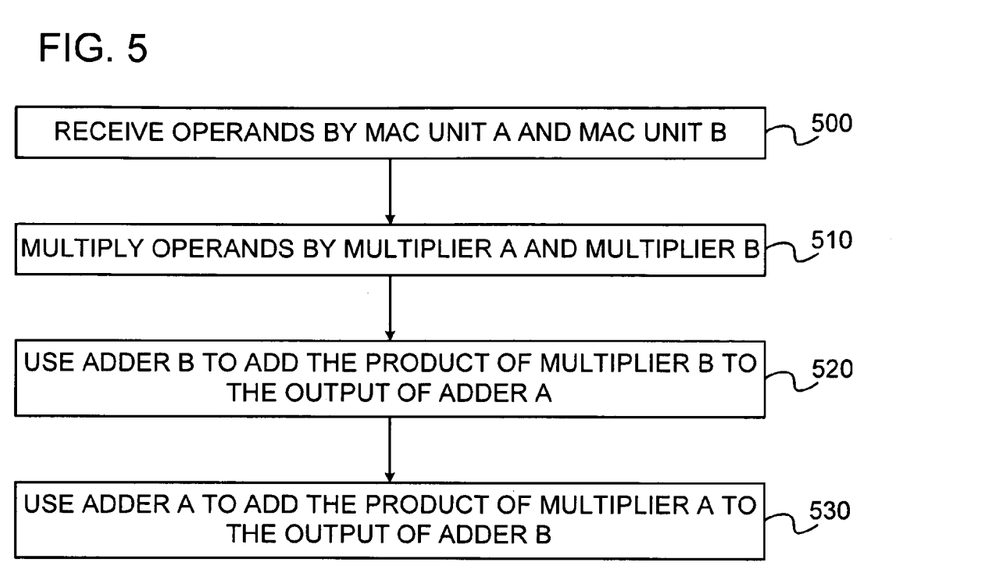
FIG. 5 is flowchart of a method for scheduling MAC operations according to demonstrative embodiments of the present invention.

Reference is now made to FIG. 5, which is a flowchart of a method for scheduling MAC operations on multiple MAC units according to embodiments of the present invention. Operations of the method may be implemented by, for example, multi-MAC unit 110 of FIG. 1, multi-MAC unit 200 of FIG. 2, multi-MAC unit 300 of FIG. 3 and/or by any other suitable units, devices, and/or systems.

As indicated at box 500, the method may include receiving operands by each multiply accumulator of a chain of two or more multiply accumulators or MAC units. Each MAC unit may include at least a multiplier and an adder. For example, a two-MAC unit implementation may include a first MAC unit "A" and a second MAC unit "B". MAC unit "A" may include a first multiplier "A" and a first adder "A" and MAC unit "B" may include a second multiplier "B" and a second adder "B".

As indicated at box 510, the method may include multiplying the received operands by the multipliers of each of the MAC units. For example, the method may include multiplying two operands by the first multiplier "A" and multiplying two other operands by the second multiplier "B". The multiplications may be performed simultaneously, for example, the multiplying process may be synchronized by a clocked signal. According to embodiments of the invention, one of the two operands multiplied by the first multiplier is constant for a predetermined duration, e.g., for a predetermined clock cycles, and one of the two operands multiplied by the second multiplier is constant for a predetermined duration, e.g., for a predetermined clock cycles.

As indicated at box 520, the method may include adding by the second adder "B" a product of the second multiplier "B" to the output of the first adder "A". The output of the first adder "A" may be identical to the product of the first multiplier "A", if the product of the first multiplier "A" is the only input to the first adder "A", as presented for example, by FIG. 2. In some embodiments the output of the first adder "A" may be different from the product of the first multiplier "A" since adder "A" may receive another input, for example, a stored result, e.g., output from the second adder "B" as presented, for example, by FIG. 3 and further indicated at box 530. Each of the adding results of adder "A" and adder "B" may be transferred and stored in a dedicated clocked memory element, for example, a D-flip flop element. For example, the sum of the product of the second multiplier "B" and the output of the first adder "A" of the first MAC unit may be saved for a predetermined duration, e.g., for a clock cycle, in a first memory element coupled to the first adder "A".

According to some embodiments of the invention and as indicated at box 530, the method may optionally include adding the output of the second adder "B" to the product of the first multiplier "A" by the first adder "A". It should be understood to a person skilled in the art the accumulated output result of the second adder "B" is being added to the result of the first multiplier "A" in a following clock cycle, i.e., the accumulated output result of the second adder "B" is being added the result of multiplying two new operands by multiplier "A".

Although in the exemplary flowchart of the method of FIG. 5, two MAC units are described, it should be understood to a person skilled in art that the invention is not limited in this respect and according to embodiments of the present invention a chain of MAC units may include two or more MAC units. In any implementation having two or more MAC units, each adder of each of the MAC units may transfer its output to the adder of the consecutive, subsequent or adjacent MAC unit while the first adder of the first MAC unit may receive the output of the last adder and may add it to the product of the first multiplier of the first MAC in the following cycle, i.e., to the product of the next two operands multiplied by the first multiplier. Other operations or sets of operations may be used in accordance with embodiments of the invention.

Embodiments of the invention may include an article such as a computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein.

Embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components. In some embodiments, such system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

According to embodiments of the invention, an architecture with a minimum value of "P" equals two MAC units, namely a first and a second MAC units may include a first MAC unit may comprise a first multiplier and a first adder, wherein the first multiplier may receive and multiply two operands and a second MAC unit may comprise a second multiplier and a second adder, wherein the second multiplier may receive and multiply two operands and wherein the second adder may receive and add a product of the second multiplier to an output of the first adder. The first adder may optionally receive and add a product of the first multiplier to an output of the second adder (presented by FIG. 3) or the first adder may optionally receive and add a product of the first multiplier to a pre-stored output. Another embodiment may further include a third MAC unit which may comprise a third multiplier and a third adder, wherein the third multiplier may receive and multiply two operands and wherein the third adder may receive and add a product of the third multiplier to an output of the second adder. The first adder may optionally receive and add a product of the first multiplier to an output of the third adder (presented by FIG. 3).

According to embodiments of the invention, one of the two operands received by the first multiplier may be the same for a predetermined duration, e.g., for a predetermined number of clock cycles and one of the two operands received by the second multiplier may be the same for a predetermined duration, e.g., for a predetermined number of clock cycles. The first MAC unit may further comprise a first memory element to hold the output of the first adder for a predetermined duration, e.g., for a predetermined number of clock cycles, and the second MAC unit may comprise a second memory element to hold the output of the second adder for a predetermined duration, e.g., for a predetermined number of clock cycles.

What is claimed is:

1. An apparatus for finite impulse response (FIR) filtering comprising:
    a processor having a program control unit to receive instructions from a program memory unit and a chain of two or more multiply-accumulators, each comprising a multiplier and an adder,
    wherein the multiply-accumulators are arranged such that an output result of a first multiply-accumulator of the chain is delivered as an input to an adder of a second subsequent multiply-accumulator of the chain and an output result of a last multiply-accumulator of the chain is delivered as an input to an adder of the first multiply-accumulator of the chain,
    wherein the multiply-accumulators are configured to receive in each cycle of the FIR filtering coefficients of the FIR filter and data input, and wherein the chain is configured to maintain, for a number of cycles that equals the number of multiply-accumulators, coefficients with respective indices for the multiply-accumulators, and if the number of coefficients of the FIR filter is greater than the number of multiply-accumulators, to replace the coefficients with new coefficients having new indices that equal the respective indices plus the number of multiply-accumulators.

2. The apparatus of claim 1, wherein the multiplier of the second multiply-accumulator is to receive and multiply two operands and wherein the adder of the second multiply-accumulator is to receive and add an output result from the multiplier of the second multiply-accumulator and an output of the first multiply-accumulator.

3. The apparatus of claim 1, wherein the adder of the first multiply-accumulator is to add a product of the multiplier of the first multiply-accumulator and the output result of the last multiply-accumulator.

4. The apparatus of claim 1, wherein the first multiply-accumulator of the chain comprises a multiplexer to select either the output of the adder of the first multiply-accumulator or an output of the adder of the last multiply-accumulator as an input to the adder of the first multiply-accumulator.

5. The apparatus of claim 1, wherein the adder of the first multiply-accumulator is to add a product of a multiplier of the last multiply accumulator of the chain and a pre-stored value.

6. The apparatus of claim 1, wherein each of the multiply-accumulators comprises a memory element to hold an output of a respective adder for a predetermined time duration.

7. The apparatus of claim 6, wherein the memory element is a clocked memory element.

8. The apparatus of claim 1, wherein at least one of the multiply-accumulators of the chain comprises a multiplexer to select either the output of the adder of the multiply-accumulator or an output of the adder of a preceding multiply-accumulator as an input to the adder of the multiply-accumulator.

9. A method for finite impulse response (FIR) filtering comprising:
    providing a chain of two or more multiply accumulators wherein each of the multiply-accumulators comprises a multiplier and an adder, wherein an output result of a first multiply-accumulator is delivered as an input to a second subsequent multiply-accumulator of the chain, and wherein an output result of a last multiply-accumulator of the chain is delivered as an input to an adder of the first multiply-accumulator; and receiving coefficients of a finite impulse response (FIR) filter and data input to the multiply-accumulators in each cycle, wherein receiving comprises maintaining for a number of cycles that equals the number of multiply-accumulators coefficients with respective indices for the multiply-accumulators, and if the number of coefficients of the FIR filter is greater than the number of multiply-accumulators, replacing the coefficients with new coefficients having new indices that equal the respective indices plus the number of multiply-accumulators.

10. The method of claim 9, further comprising:
multiplying two operands by the multiplier of the second multiply-accumulator; and
adding, by an adder of the second multiply-accumulator, an output result from the multiplier of the second multiply-accumulator and an output of an adder of the first multiply accumulator of the chain.

11. The method of claim 9, further comprising:
adding, by the adder of the first multiply-accumulator, a product of the multiplier of the first multiply-accumulator to the output result of the last multiply-accumulator.

12. The method of claim 9, further comprising:
selecting, by a multiplexer of the first multiply-accumulator of the chain, either the output of the adder of the first multiply-accumulator or an output of the adder of the last multiply-accumulator as an input to the adder of the first multiply-accumulator.

13. The method of claim 9, further comprising adding by the adder of the first multiply-accumulator a product of a multiplier of the last multiply-accumulator to a pre-stored value.

14. The method of claim 9, further comprising:
selecting, by a multiplexer of at least one of the multiply-accumulators of the chain, either the output of the adder of the multiply-accumulator or an output of an adder of a preceding multiply-accumulator as an input to the adder of the multiply-accumulator.

15. An article comprising a non-transitory computer-storage medium having stored thereon instructions that, when executed by a processing platform, result in:
delivering an output result of a first multiply-accumulator of a chain of two or more multiply accumulators as an input to a second subsequent multiply-accumulator of the chain, wherein each of the multiply-accumulators comprises a multiplier and an adder;
delivering an output result of a last multiply-accumulator of the chain as an input to an adder of the first multiply-accumulator; and
receiving coefficients of a finite impulse response (FIR) filter and data input to the multiply-accumulators in each cycle, wherein receiving comprises maintaining for a number of cycles that equals the number of multiply-accumulators coefficients with respective indices for the multiply-accumulators, and if the number of coefficients of the FIR filter is greater than the number of multiply-accumulators, replacing the coefficients with new coefficients having new indices that equal the respective indices plus the number of multiply-accumulators.

* * * * *